Jan. 27, 1959 E. P. G. WRIGHT ET AL 2,871,464

METHODS OF RECORDING INTELLIGENCE

Filed March 22, 1954

Inventors
E.P.G. WRIGHT - J. RICE -
D.G.N. HUNTER

By Robert Harding Jr.
Attorney

United States Patent Office 2,871,464

Patented Jan. 27, 1959

2,871,464

METHODS OF RECORDING INTELLIGENCE

Esmond Philip Goodwin Wright, Joseph Rice, and Donald Gordon Neal Hunter, London, England, assignors to International Standard Electric Corporation, New York, N. Y.

Application March 22, 1954, Serial No. 417,808

Claims priority, application Great Britain February 17, 1954

1 Claim. (Cl. 340—174)

This invention relates to the storage of intelligence.

The object of the invention is to provide improved means for modifying intelligence stored in the form of a series of elements in a medium capable of sustained storage without external stimulus, such as magnetic line recorders, e. g. tape or drum.

Application, Serial No. 289,383, filed May 22, 1952, describes a magnetic drum store in which the two halves of a peripheral track are used as duplicate stores for the same stored intelligence, in which the reading and recording heads are 180° apart around the drum track, and in which for changing stored intelligence, the record on one half track is read, modified, and re-recorded on the other half track. This is wasteful of storage space.

According to the present invention there is provided equipment for the storage of intelligence in the form of elements each stored in a defined elemental store, which includes means for recording intelligence element by element in said elemental stores, separate means for reading intelligence element by element, means for mounting said separate reading and recording means in spaced relation adjacent to said elemental stores, means for relatively moving said elemental stores on the one hand and said reading and recording means on the other hand, and means for passing intelligence elements read by said reading means to said recording means in the same or in changed form and in such a manner relative to said spaced relation and said relative movement that a read element is recorded in the same elemental store from which it was read.

One embodiment of the invention will now be described with reference to the accompanying drawings in which.

Figure 1:
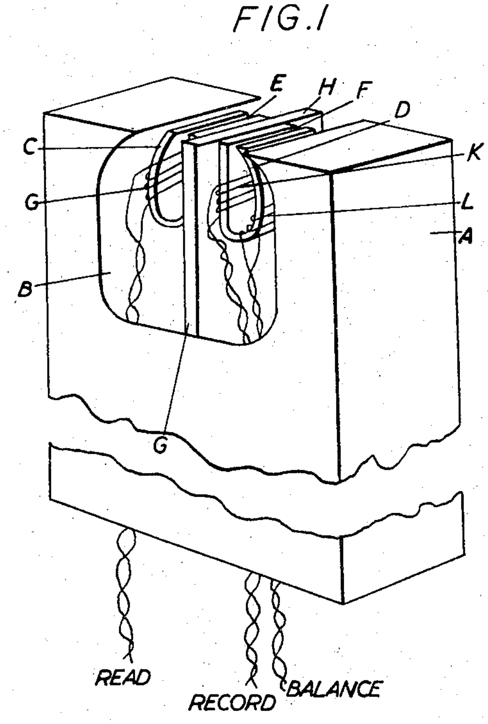
Fig. 1 shows a double-head in which both the reading and recording heads are fixed in a common mounting block.

The arrangement to be described may be used with the phase modulator type of recording, but it will be understood that it may also be used with other known forms of recording, e. g. telegraph type.

In the equipment to be described the reading head and recording head are mounted substantially the length of one elemental store apart and adjacent the track upon which the information is stored. Each element read by the reading head is examined by a modifying circuit and, if the conditions are such that the element is to be changed, a changed element is passed to the recording head for re-recording. The reading, modifying and re-recording takes place in the time taken for the elemental store to pass between the reading and recording heads so that the changed element is overprinted on the read element in the same elemental store from which it was read. If the conditions of the modifying circuit are such that the read element is not to be changed then no recording current is passed to the recording head and the element remains in its store unaffected.

It will be realised of course that the reading and recording heads may be mounted further apart than the length of one elemental store provided the delay between reading and re-recording is appropriately increased.

Previously recording was continuous in the sense that for a large fraction of the time information was being recopied again and again on itself; the recording current can now be turned off except when modification of the record is necessary, thus greatly reducing the possibility of random errors being introduced into the store, and makes easier the design of equipment to safeguard the information in the event of power supply failure.

The invention is applicable among other things to telecommunication systems, computer systems, transport and theatre booking systems.

Apparatus used with the invention will comprise a storage medium with storing and reading heads and means intermediate said heads for modifying information passing from the reading head to the storing head. The modification can be by way of addition, subtraction or other mathematical operation.

The device to be used for storing a plurality of items of information is a rotating magnetic drum. On the surface of the drum are a number of parallel tracks, the tracks going round the periphery of the drum. The number of tracks on the drum is dependent upon the storage requirements. Each track has a read head and a storage head, the two heads being connected together via electronic control equipment.

A track may be considered as composed of a number of element positions. In practice it is possible to have up to 150 elements per inch round the periphery. For example, a drum of 2 inches diameter, i. e. approximately 6 inches circumference, may have 900 elements per track and, if the maximum value to be stored for the individual items of information requires 20 elements arranged in binary form, the track may be used for storing 45 independent items. For additional independent items the number of tracks would be increased accordingly and separate heads and control equipment added. Consider another example in which the maximum item to be stored is the number, 10,000, and the number of individual items is to be 1,000. Using a binary method of storage 10,000 may be represented by using 14 binary elements. If it is desired to have 100 items per track, the required elements per track will be 1,400 and, using a packing of 100 elements per inch of periphery, the circumference of the drum would be 14 inches (approximately 4½ inches diameter). Ten such tracks would be required and if the tracks have a separation of ½ inch between centre, the axial length of the drum would be approximately 6 inches. Each track would have its own read and record heads and control equipment.

The read head RDH reads in turn the elements passing underneath it and, if they require modification, passes them to a device which performs the change. The modified elements are then transferred to the store head STH and overprint the original elements. If any of the read elements do not require modification, however, then the store head is isolated from these elements during their passage under it. Thus it will be seen that in any particular group of elements only those elements which require to be modified are transferred (after modification) to the store head to overprint the element with the new value.

Fig. 1 illustrates a double-head in which both reading and recording heads are fixed in one mounting.

The mounting comprises a rectangular brass block A having a roughly channel shaped piece B cut out at one end. The read and record heads, C and D each comprise a core made from a sheet of high permeability material, such as nickel-iron, bent into the shape of a D and with a gap (E and F) at the upper end of the vertical portion of the D. One core is mounted on either side of a brass plate G with the vertical part of the D adjacent the surface of the plate G and the gapped end of the core on a level with edge H of the plate G. Round the core of head C is wound a reading coil J and round the core of the head D is wound a recording coil K and a balancing coil L. The lead out wires of all three coils are brought out through the end of the block A remote from the channel B.

The plate H carrying the reading and recording heads is placed in the centre of the channel shaped cut out in the block A and cemented into place with a bonding resin. Finally the mounting is machined so that gapped portions of the heads C and D, the edge H of the plate G and the upper surfaces of the upstanding portions of the block A are flat.

The distance between the gaps E and F is dependent upon the thickness of the plate G and the thicknesses of the vertical parts of the D shaped cores. When used on the equipment described above, the distance between the gaps in, the length of one elemental store plus a small length dependent upon the delay introduced by the reading and recording heads themselves. The total distance between the gaps is referred to in the claim as "substantially the length of an elemental store."

Figure 2:
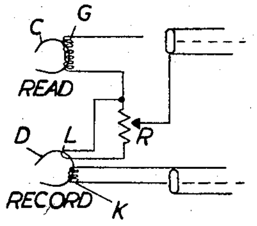
Fig. 2 shows how the balancing coil illustrated in Fig. 1 is used.

Fig. 2 is a schematic diagram showing the use of the balancing coil.

Due to the high amplitude of a recording pulse and the close proximity of the reading and recording heads, part of each recording pulse is induced into the reading head coil. This is obviously undesirable, and so in order to balance out the induced voltage a coil L is wound upon the recording head core and is connected across a variable resistor R which in turn is connected in series with the reading head coil G. The direction of winding of the coil L is such that the potential developed across the resistor R is in opposite phase to that induced into the reading head by the recording pulse. By adjusting the resistor R, the amplitude of the two potentials can be made approximately equal.

While the principles of the invention have been described above in connection with specific embodiments, and particular modifications thereof, it is to be clearly understood that this description is made only by way of example and not as a limitation on the scope of the invention.

What we claim is:

Equipment for the storage of intelligence in the form of elements each stored in a defined elemental store comprising reading means including a reading head having a working gap, recording means including a recording head having a working gap, a support, means for mounting both heads in said support in spaced relation such that the distance between the working gaps of said heads is substantially equal to the length of an elemental store, a reading coil in said reading head, a recording coil in said recording head, a balancing coil in said recording head, means for connecting said balancing coil in series with said reading coil, said balancing coil being so poled that potentials induced in said reading coil and sail balancing coil from alternating current flowing in said recording coil are in opposite phase, whereby a reduction in the combined induced potentials is obtained.

References Cited in the file of this patent

UNITED STATES PATENTS

| | | |
|---|---|---|
| 2,629,861 | Begun | Feb. 24, 1953 |
| 2,672,944 | Minton | Mar. 23, 1954 |
| 2,700,148 | McGuigan | Jan. 18, 1955 |